United States Patent
Chang et al.

[19]

[11] Patent Number: 6,106,752
[45] Date of Patent: Aug. 22, 2000

[54] USE OF INJECTION MOLDING TO ORIENT SHORT FIBERS IN DESIRED DIRECTIONS

[75] Inventors: Ching-Chian Chang; Cheng Shaw, both of Copley; Robert Henry Vogliano, Tallmadge, all of Ohio

[73] Assignee: The Goodyear Tire & Rubber Company, Akron, Ohio

[21] Appl. No.: 09/194,417

[22] PCT Filed: Sep. 24, 1996

[86] PCT No.: PCT/US96/15237

§ 371 Date: Nov. 27, 1998

§ 102(e) Date: Nov. 27, 1998

[87] PCT Pub. No.: WO98/13185

PCT Pub. Date: Apr. 2, 1998

[51] Int. Cl.[7] .................................. B29C 17/00
[52] U.S. Cl. ........................ 264/108; 264/328.12
[58] Field of Search ................ 264/108, 328.1, 264/328.2, 328.12

[56] References Cited

U.S. PATENT DOCUMENTS

| | | | |
|---|---|---|---|
| 3,901,961 | 8/1975 | Görter et al. | 264/108 |
| 4,000,229 | 12/1976 | Wainer | 264/24 |
| 4,094,952 | 6/1978 | Frank | 264/328 |
| 4,790,992 | 12/1988 | Nishikawa | 425/206 |
| 4,919,876 | 4/1990 | Savage et al. | 264/258 |
| 4,994,220 | 2/1991 | Gutjahr et al. | 264/69 |
| 5,074,772 | 12/1991 | Gutjahr | 425/130 |
| 5,156,907 | 10/1992 | Layden | 428/302 |
| 5,262,106 | 11/1993 | Graham et al. | 264/108 |
| 5,281,380 | 1/1994 | Umeda et al. | 264/108 |
| 5,331,751 | 7/1994 | Harwood | 36/77 |
| 5,702,546 | 12/1997 | Itoh et al. | 152/209 R |

FOREIGN PATENT DOCUMENTS

| | | | |
|---|---|---|---|
| 4030274C1 | 10/1991 | Denmark | B29C 47/90 |
| 0419403 | 3/1991 | European Pat. Off. | C03B 11/14 |
| 03114811 | 8/1991 | Japan | B29C 45/14 |
| 04090317 | 3/1992 | Japan | 264/108 |

OTHER PUBLICATIONS

Document entitled Abrasion Failure of Vulcanizate Containing Short Fibres.
Prior art search.
Document entitled Tires Made of Short Fiber Reinforced Rubber by Naohiko Kikuchi dated Jun. 1996.
Patent Abstracts of Japan.
International Search Report.

*Primary Examiner*—Jan H. Silbaugh
*Assistant Examiner*—Dae Young Lee
*Attorney, Agent, or Firm*—Roger D Emerson

[57] ABSTRACT

A method for molding short fiber/rubber composite articles having enhanced mechanical properties by aligning short reinforcing fibers during an injection molding process. The method comprises injecting a molding mixture through an injection gate arranged in a predetermined relationship to the molding cavity. The injection gate has a relatively small thickness in comparison to the thickness of the molding cavity. The fibers are associated with a first direction, generally parallel to the flow of the molding mixture as the molding mixture moves through the gate. As the molding mixture passes through the gate and into the cavity, the fiber direction is altered as the molding material fills the cavity.

9 Claims, 6 Drawing Sheets

USE OF INJECTION MOLDING TO ORIENT SHORT FIBERS IN DESIRED DIRECTIONS

TECHNICAL FIELD

This invention pertains to the art of methods and apparatuses for producing short fiber/rubber composite articles through injection molding and to those composite articles so produced, and more specifically to methods and apparatuses for orienting the reinforcing fibers of a composite article in a predetermined direction.

BACKGROUND ART

Generally, composite articles formed of an elastomeric base material and reinforcing fibers are common in the art. The reinforcing fibers impart improved mechanical properties, such as abrasion resistance, tensile strength, compression resistance, and the like to the composite article. The fiber distribution and orientation are important factors which affect such properties. Controlling fiber orientation, therefore, is an important consideration in order to provide a composite article having the desired mechanical properties.

There are known techniques for orienting reinforcing fibers in an elastomeric material. However, in many processes the fibers are generally oriented in a direction consistent with and parallel to the initial material flow direction. A problem encountered in the art relates to orienting reinforcing fibers in a composite article in a direction which differs from the material flow and especially in a direction perpendicular thereto.

One method proposed to orient fibers in a composite article in a direction which varies from the material flow is disclosed in U.S. Pat. No. 5,156,907 wherein a heated mixture of molding compound (glass) and fibers (carbon) is injected through an elongated injection port into a die. The injection port has a thickness which is purported to be between 30%–70% of the die thickness. The optimum fiber length is 0.5 inches (1.27 cm) for the particular carbon fiber/glass matrix utilized.

U.S. Pat. No. 5,281,380 discloses a fiber reinforced elastic sheet in which staples are oriented in the vertical direction of the sheet. Staple material, such as Nylon 66, is mixed into thermoplastic material and extruded through a molding die. The molding die includes a weir portion which is said to initially orients the fibers in the flow direction. Downstream from the weir portion is a flow passage which has a dimension at least twice that of the weir portion. After passing through the weir portion, the flow direction is changed, thereby changing the fiber orientation with respect to the sheet surface. The sheet so formed can then be further processed for an intended application.

The present invention provides methods and apparatuses for orienting short fibers (fibers having a length of 0.1 microns to $10^3$ microns) in a composite article formed by injection molding a molding compound comprising a fiber/elastomeric material blend. The fibers utilized are known as "short fibers" in the art and have a length considerably shorter than the 0.5 inch (1.2 cm) length of short fibers of the U.S. Pat. No. 5,156,907 patent discussed in above.

DISCLOSURE OF INVENTION

The present invention is directed to methods and apparatuses for forming composite articles comprising reinforcing fibers. More particularly, the present invention is directed to methods and apparatuses for directing fiber orientation in composite articles formed by injection molding a molding compound composed of short fibers and elastomeric material.

According to one aspect of the present invention, a method for producing a fiber reinforced composite article by curing a molding compound after injecting the molding compound into a mold cavity of a mold, the molding compound comprising elastomeric material and reinforcing fibers, the fibers having a length from 0.1 microns to $10^3$ microns is provided. The method is characterized by the steps of:

a) directing a first portion of the molding compound through a first inlet gate, the first inlet gate having an associated length $l_1$, width $w_1$, and thickness $t_1$, and wherein a majority of the reinforcing fibers contained in the first portion are oriented parallel to the initial injection direction, X; and, b) directing the first portion from the first inlet gate into a first region of said mold cavity, the first region of the mold cavity having a dimension, $T_1$, parallel to $t_1$, wherein $T_1$ is greater than or equal to $10t_1$, the first portion forming a series of folding planes perpendicular to XZ plane in the first region, and wherein the majority of the reinforcing fibers are oriented in a direction perpendicular to the gate plane, XZ plane, or oriented in the Y direction.

According to another aspect of the invention, the method further includes the steps of:

c) directing a second portion of the molding compound through a second inlet gate, the second inlet gate having an associated length, $l_2$, width, $w_2$, and thickness, $t_2$, and wherein a majority of the reinforcing fibers contained in the second portion are oriented parallel to the injection direction X; and, d) directing the second portion from the second inlet gate into a second region of the mold cavity, the second region of the mold cavity having a dimension, $T_2$, parallel to $t_2$, wherein $T_2$ is greater than or equal to $10t_2$, the second portion forming a series of planes, the folding planes being perpendicular to XZ plane in the second region, and wherein the majority of the reinforcing fibers are oriented in a direction perpendicular to the XZ plane, or oriented in the Y direction.

According to another aspect of the invention, the method further comprises the step of:

forming the molding compound by mixing the fiber to the elastomeric material in a weight ratio of from 1% to 20%.

According to another aspect of the invention, a composite article comprising elastomeric material and reinforcing fibers having a first area wherein a majority of said fibers contained therein are oriented in a first direction and a second area wherein a majority of said fibers contained therein are oriented in a second direction is produced by:

a) injecting a first portion of a molding compound through a first inlet gate, said first inlet gate having an associated length, $l_1$, width, $w_1$, and thickness $t_1$, and wherein a majority of said reinforcing fibers contained in said first portion are oriented parallel to the injection direction X;

b) directing said first portion from said first inlet gate into a first region of said mold cavity, said first region of said mold cavity having a dimension, $T_1$, parallel to $t_1$, wherein $T_1$ is greater than or equal to $10t_1$, said first portion forming a series of folding planes perpendicular to XZ plane in said first region, and wherein said majority of said reinforcing fibers are oriented in a direction perpendicular to XZ plane, said first portion forming said first area of said composite article upon curing said molding compound;

c) injecting a second portion of said molding compound through a second inlet gate, said second inlet gate having an associated length l2, width w2, and thickness t2, and wherein a majority of said reinforcing fibers contained in said second portion are oriented parallel to the injection direction X; and, d) directing said second portion from said second inlet gate into a second region of said mold cavity, said second region of said mold cavity having a dimension T2, parallel to t2, wherein T2 is greater than or equal to 10t2, said second portion forming a series of planes, said planes being perpendicular to X-Z plane in said second region, and wherein said majority of said reinforcing fibers are oriented in a direction perpendicular to X-Z plane, said second portion forming said second area of said composite article upon curing said molding compound.

According to yet another aspect of the invention, a method of producing a composite article having reinforcing fibers in first and second areas is provided. The fibers in the first area are aligned in a first pre-determined direction and the fibers in the second area are aligned in a second predetermined direction. The method being characterized by the steps of:

a) filling a first region of a mold cavity with a first portion of a molding compound having reinforcing fibers therein, a majority of said reinforcing fibers being aligned in said first pre-determined direction;

b) filling a second region of said mold cavity with a second portion of said molding compound, a majority of said reinforcing fibers being aligned in said second pre-determined direction; and, c) curing said molding compound.

According to another aspect of the invention, the step of filling said first region of said mold cavity comprises:

a) associating said first region with a first inlet gate, said first inlet gate having an associated length l1, width w1, and thickness t1, said first region having a dimension T1 parallel to t1 with T1 being greater than or equal to 10t1; and, b) injecting said first portion through said first inlet gate wherein a majority of said reinforcing fibers in said first portion are aligned parallel to l1 in said first inlet gate.

According to another aspect of the invention, the step of filling said second region of said mold cavity comprises:

a) associating said second region with a second inlet gate, said second inlet gate having an associated length l2, width w2 and thickness t2, said second region having a dimension T2 parallel to t2 with T2 being greater than or equal to 10t2; and, b) injecting said second portion through said second inlet gate wherein a majority of said reinforcing fibers in said second portion are aligned parallel to l2 in said second inlet gate.

One advantage of the present invention is the ability to align short fibers in a composite article in a direction which differs from the initial flow direction.

Another advantage of the invention is the ability to form a composite article having fibers aligned in pre-determined direction.

Yet another advantage of the invention is the ability to form a composite article having fibers aligned in a first predetermined direction in a first area and fibers aligned in a second predetermined direction is a second area.

Another advantage of the present invention is the ability to form a composite article through an injection molding process wherein the composite article comprises reinforcing fibers which are aligned to optimize the article's performance.

Still other benefits and advantages of the invention will become apparent to those skilled in the art to which it pertains upon a reading and understanding of the following detailed specification.

BRIEF DESCRIPTION OF DRAWINGS

The invention may take physical form in certain parts and arrangement of parts, a preferred embodiment of which will be described in detail in this specification and illustrated in the accompanying drawings which form a part hereof and wherein.

DETAILED DESCRIPTION OF THE INVENTION

Figure 1:
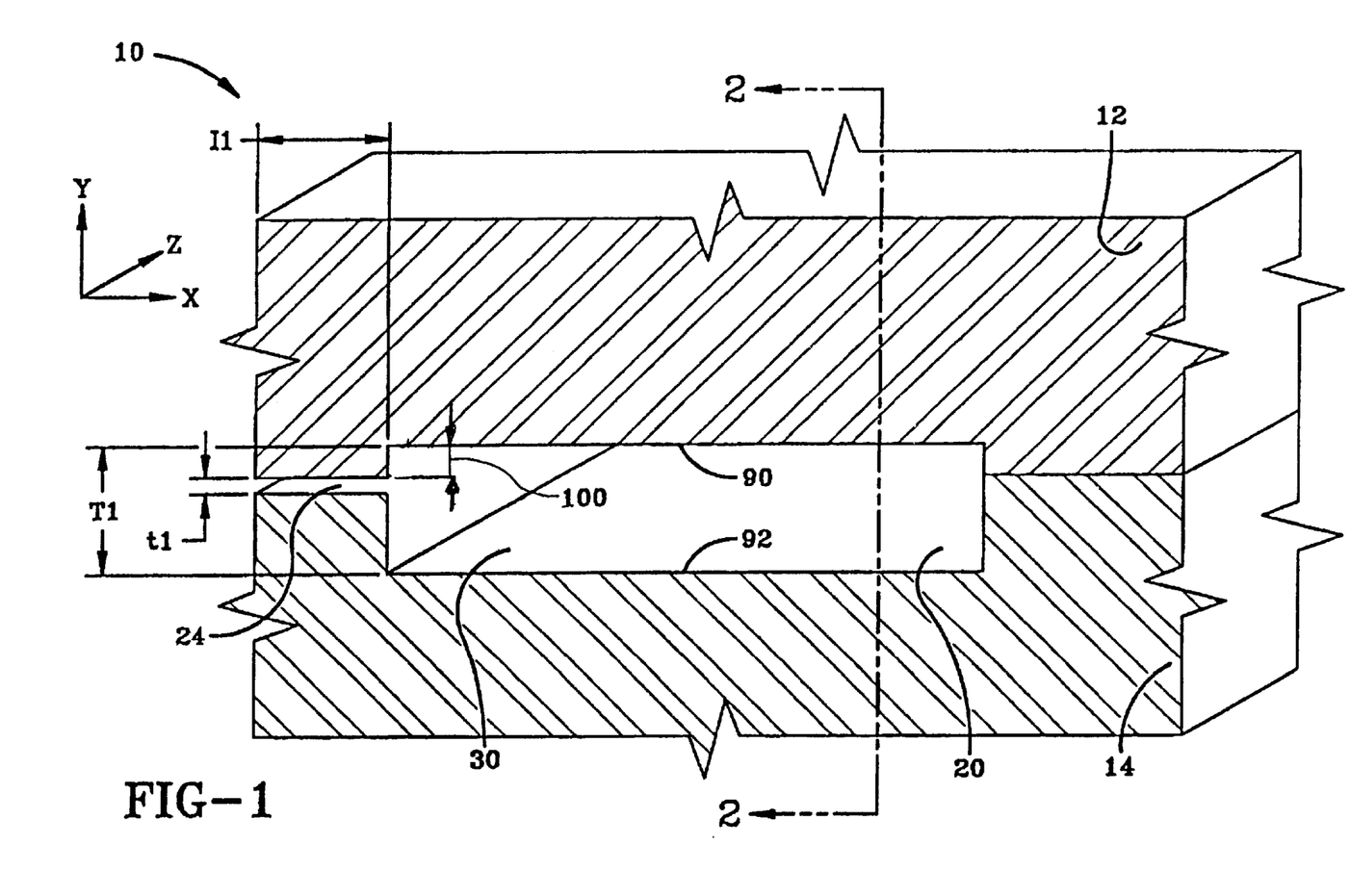
FIG. 1 is a perspective cross-sectional view of an exemplary mold used in an injection molding process according to the present invention.

Referring now to the drawings wherein the showings are for purposes of illustrating a preferred embodiment of the invention only and not for purposes of limiting the same, FIG. 1 shows a side sectional view of an exemplary mold assembly 10 having first and second mold members 12,14 which cooperate to form a mold cavity 20. An inlet gate 24 directs a flow of molding compound (not shown) into a first region 30 of the mold cavity 20.

In this example, the mold cavity 20 is associated with a thickness T1, in a direction perpendicular to the plane of material flow through inlet gate 24. The gate 24 has an associated thickness t1. In a preferred embodiment of the invention, T1 is greater than or equal to 10t1.

Inlet gate 24 is associated with a length l1 which is sufficient to initially orient short fibers carried in the material flow as will be discussed later in this specification. If length l1 is too long the molding compound 30 may scorch or even cure in the inlet gate 24, leading to poor quality in the component. If the length l1 is too short, the fibers 64 may not become fully oriented in the direction of flow before entering the mold cavity 20.

For example, in a trial involving a block of rubber, l1 was equal to 1.3 inches (3.3 cm) and thickness t1 was equal to 0.016 inches (0.04 cm). In this trial, the ratio of the $l_1$ to the thickness $t_1$ was 81 and was sufficient to deliver good performance.

In another example a trial was conducted. In this trial $l_1$ was equal to 0.25 inches (0.64 cm) and thickness $t_1$ was equal to 0.025 inches (0.064 cm). In this trial, the ratio of the $l_1$ to the thickness $t_1$ was 10 and was not sufficient to deliver good performance. This ratio didn't provide enough orientation to the fibers.

In another trial, $l_1$ was equal to 1.2 inches (3.05 cm) and thickness $t_1$ was equal to 0.016 inches (0.04 cm). In this trial, the ratio of the $l_1$ to the thickness $t_1$ was 75 and was sufficient to deliver good performance. This ratio has continued to perform well and is the preferred ratio.

Figure 2:
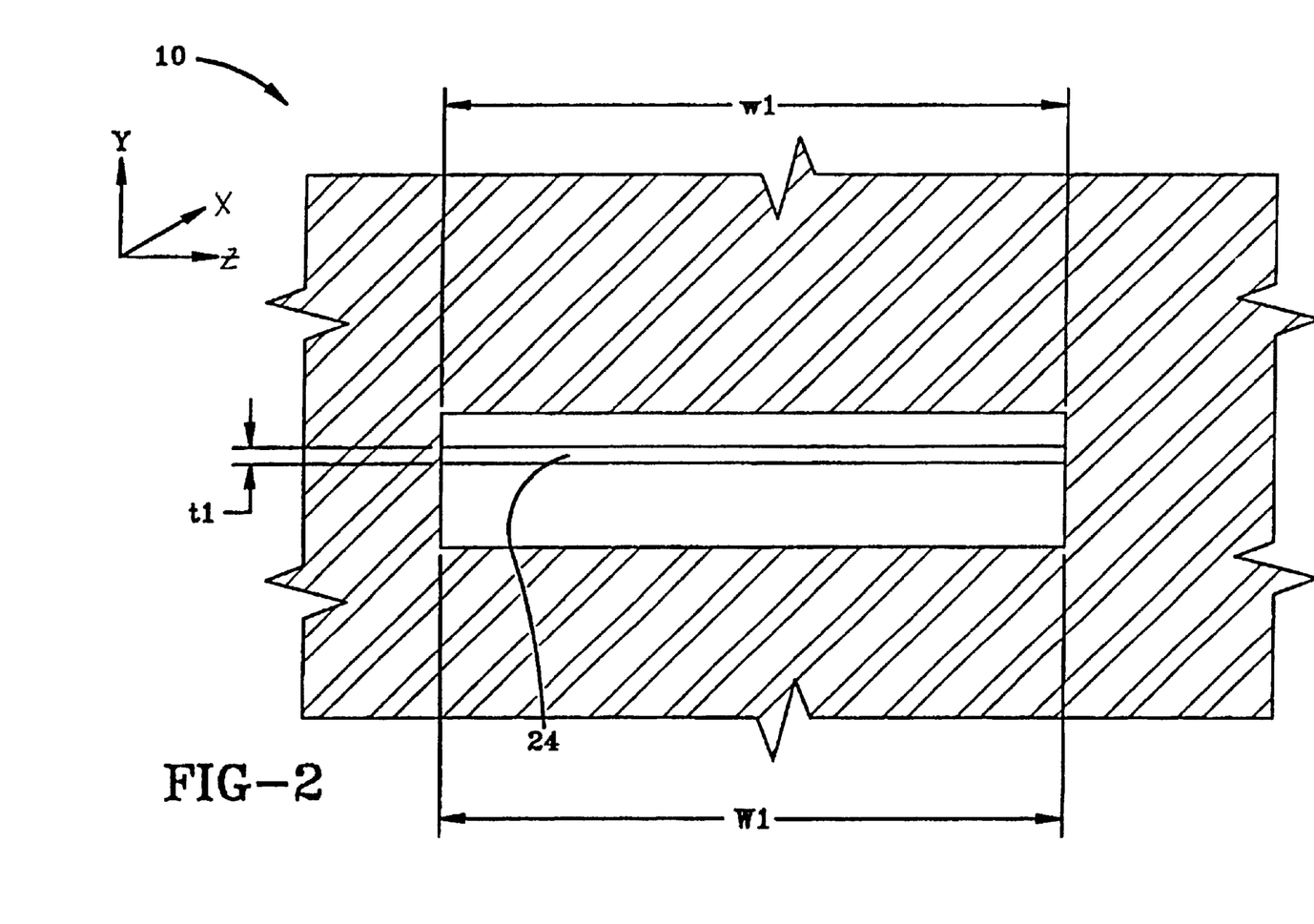
FIG. 2 is a end sectional view of the mold of FIG. 1 taken along line 2—2 of FIG. 1.

With reference to FIG. 2, the inlet gate 24 is associated with a width $w_1$ which is essentially the same as the width $W_1$ of mold cavity 20.

Figure 3:
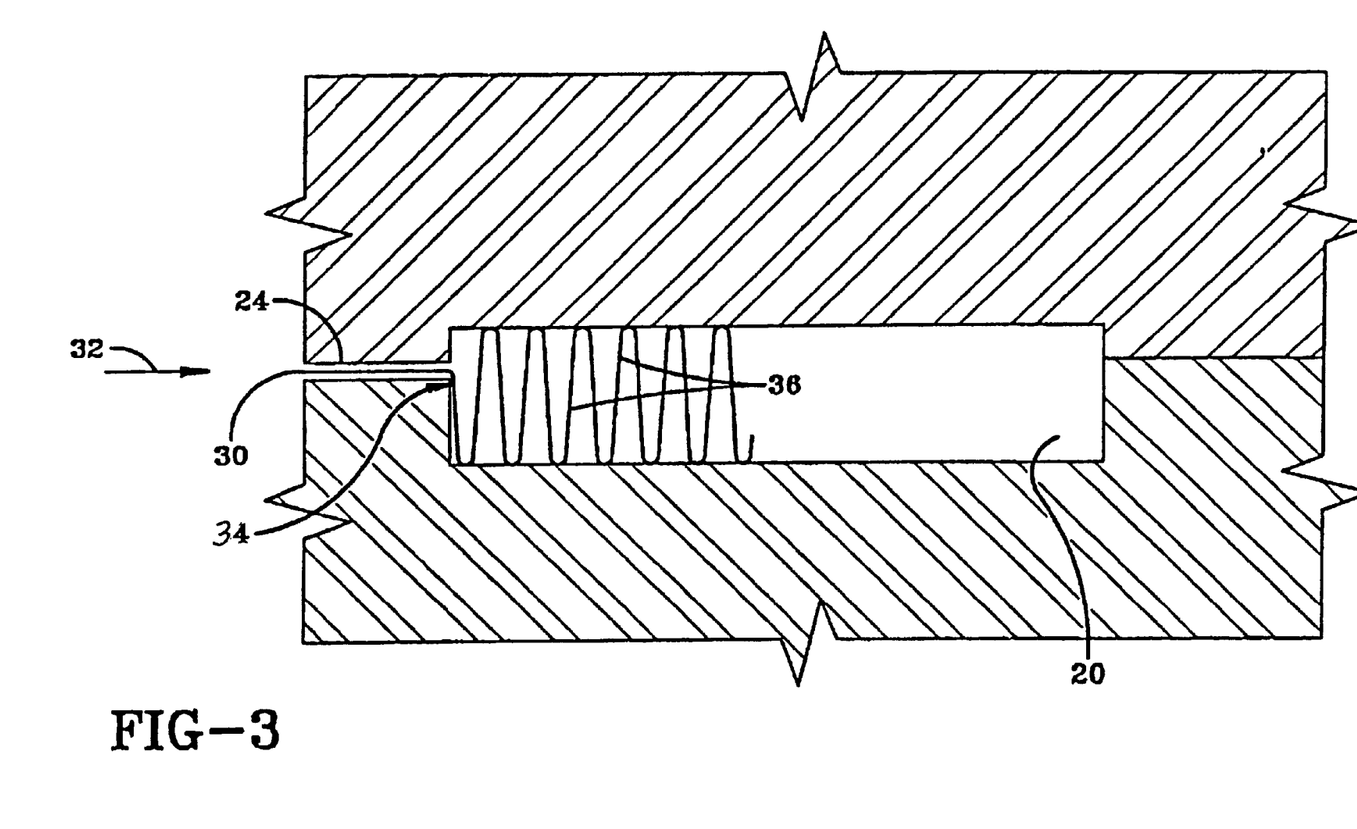
FIG. 3 is a view similar to FIG. 1 showing the introduction of molding compound into the mold.

As shown in FIG. 3, in an injection molding process, a molding compound 30 is forced through inlet gate 24 from a typical runner system (not shown). The molding compound 30 is therefore directed in a first direction, or direction of flow, parallel to the length $l_1$ of inlet gate 24, as indicated by arrow 32. As the molding compound 30 passes into a first end 34 of mold cavity 20, the flow direction changes with respect to the first direction. In the embodiment shown in FIG. 3, at the junction of the inlet gate 24 with the mold cavity 30, the second flow direction is generally perpendicular to the first direction. The molding compound then folds over onto itself, creating a series of planes 36 generally perpendicular to the first direction as the molding compound fills the mold cavity.

In a preferred embodiment, the molding compound 30 comprises elastomeric material and reinforcing fibers. The reinforcing fibers are commonly known as "short fibers" and may be kevlar pulp, nylon, hyten, PET, POY nylon and PET, crimped nylon, Lycra Spandex, PAN carbon fibers, acrylic, graphite carbon whiskers and the like having a length in the range of from 0.1 microns to $10^3$ microns.

The length $l_1$ and thickness $t_1$ of the inlet gate 24 are designed to cause orientation of the short fibers within the inlet gate 24 upstream from the mold cavity 20. Because of the range of fiber length, the thickness $t_1$ of the inlet gate 24 must be comparably narrow with respect to inlet ports known in the prior art in order that a majority of the fibers are aligned with the flow. Preferably, there is a swelling ratio of at least 0.80 in the flow direction as indicated by arrow 32. The swelling ratio is defined as a short axis divided by a long axis when a circular short fiber loaded rubber sample is swelled into an oval shape in toluene to equilibrium state. The short axis direction is parallel to the fiber orientation direction. A swell ratio less than 1.0 indicates the existence of fiber orientation. The smaller the swelling ratio, the higher the degree of fiber orientation. A swelling ratio of 1.0 denotes no orientation. Likewise, the inlet gate 24 must have a minimum length 1 to allow sufficient flow time in order to orient the fibers.

Upon passing through the inlet gate 24 into the mold cavity 20, the direction of flow of the molding compound is altered. At the junction of the inlet gate 24 with the mold cavity 20, the opening for the molding material is significantly increased in the direction parallel to thickness $t_1$ of the inlet gate 24, or perpendicular to the initial flow direction, causing the flow direction to be altered which affects the fiber orientation with respect to the initial flow direction.

After the mold cavity is filled, the molding compound is cured to form the composite article of the present invention.

With reference again to FIG. 1, the offset distance 100 between the inlet gate 24 and a first interior wall 90 will now be discussed. The distance between the inlet gate 24 and the interior walls 90,92 of the mold cavity 20 can influence the orientation of the fibers.

If the offset distance 100 is too small, the molding compound 30 may get hung up or temporarily attached to the nearest interior wall 90,92. For ease of explanation, the following discussion will be made with reference to interior wall 90 although the discussion is equally applicable to either, closer interior wall 90,92. As stated, if the offset distance 100 is not chosen with consideration of the particular molding conditions, the folding pattern desired may be destroyed by the molding compound 30. For example, for molding compounds 30 which are especially tacky, or which are molded at conditions which make the molding compound 30 especially tacky, the offset distance 100 must be large enough to avoid the problem addressed above. While some molding compounds 30 can be successfully run in some conditions where the offset distance 100 is equal to zero, generally the offset distance 100 should be greater than $0.25\ T_1$.

If the offset distance 100 is too great, for example equal to $0.50\ T_1$, some molding compounds 30 in some particular applications may not generate the type and number of folds necessary to achieve the desired fiber orientation. The particular parameters of each application, including gate dimensions, offset distance, compound tack characteristics, molding temperature, etc. are discussed below.

EXAMPLE 1

Figure 4:
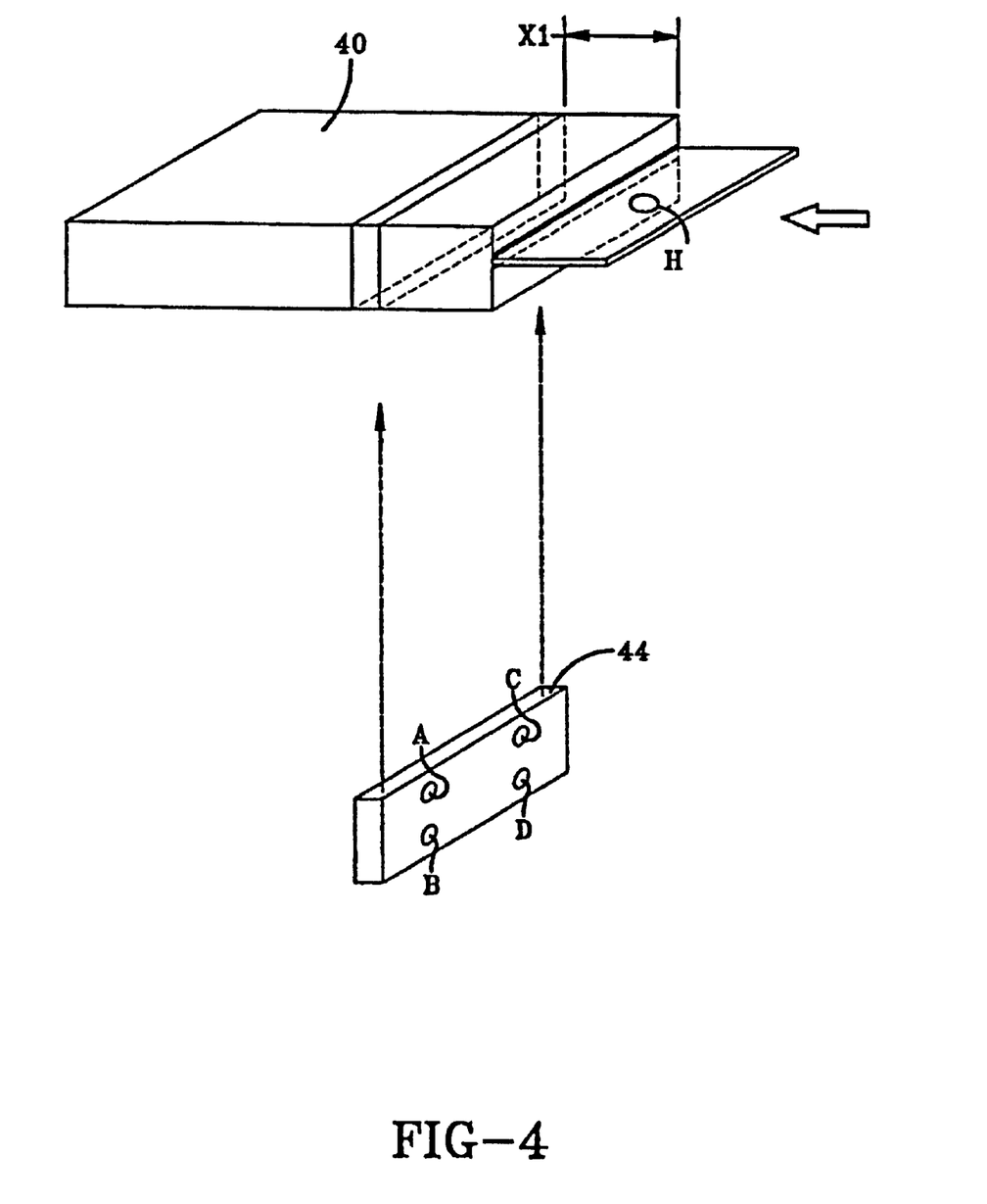
FIG. 4 is a schematic view in partial cross-section of a composite article formed in the mold of FIG. 1 according to the present invention.

FIG. 4 represents a first sample composite article 40 formed by the inventive process. Molding compound was fed by a runner to an inlet gate of a molding cavity. In the present example, the molding cavity measured 5 inches (12.7 cm)×5 inches (12.7 cm)×1 inch (2.54 cm). The gate had a corresponding thickness of 0.01 inches (0.025 cm) and a length of 1.3 inches (3.3 cm). After curing, a sample slice 44 was taken from the sample at a point a distance $x_1$ inward from the inlet gate 24. The distance $x_1$ was equal to 0.75 inches (1.9 cm).

With continuing reference to FIG. 4, four plugs A,B,C,D of the sample slice 44 having faces perpendicular to the original flow direction were analyzed regarding fiber orientation by solvent swelling techniques. Plug H was formed in the inlet gate was also analyzed. The results are summarized in TABLE I below:

TABLE I

Solvent Swelling Ratio

Gate (Plug H)—0.80 in first direction (parallel to first flow direction)
Plug A—0.80 in second direction (generally perpendicular to first flow direction)
Plug B—0.88 in second direction (generally perpendicular to first flow direction)
Plug C—0.86 in second direction (generally perpendicular to first flow direction)
Plug D—0.94 in second direction (generally perpendicular to first flow direction)

As is apparent, the orientation of the fibers in the cured composite article 40 is influenced by the length and thickness of the gate dimensions. Therefore, it is possible to produce a short fiber/rubber composite article wherein the fiber orientation is optimized according to the stresses it is designed to withstand during its intended use.

EXAMPLE 2

Figure 5:
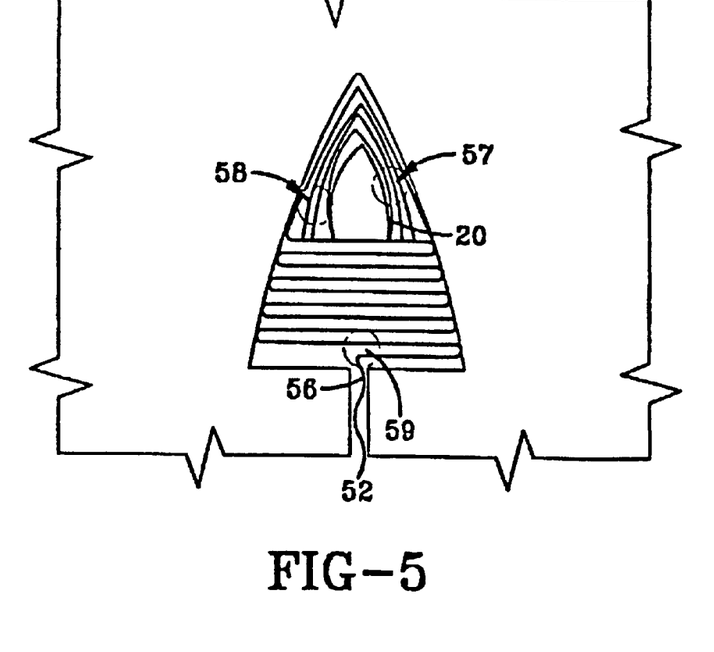
FIG. 5 is a front cross-sectional view of another embodiment of a mold and molding compound according to the invention.

With reference to FIG. 5, it is also possible to form a composite article through an injection molding process wherein the molding compound 52 is introduced into a mold cavity 20 through inlet gates 56. The resulting composite article would then comprise a plurality of areas, each having fibers oriented in a predetermined direction determined by the regions 57, 58, 59 of the mold cavity 20 filled through associated inlet gates 56. Such composite articles may include tire components. For example, the inventive process herein described can be used with treads, retreads, apexes, sidewalls, chafers and toeguards.

Figure 6:
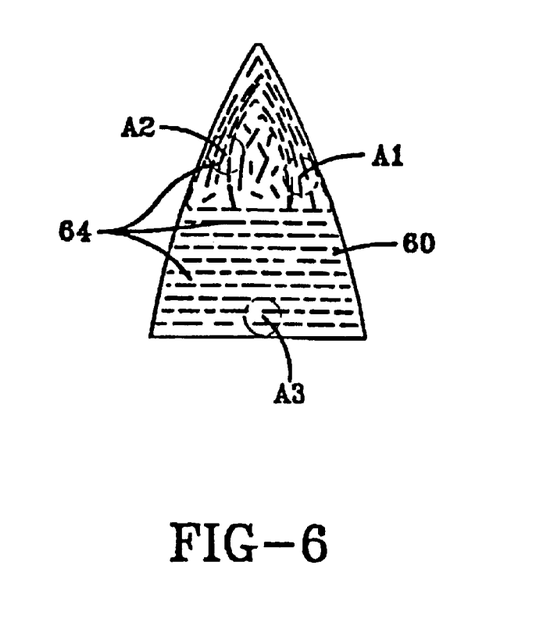
FIG. 6 is a cross-sectional view of a composite article formed in the mold of FIG. 5.

With reference to FIG. 6, a tire apex 60 is shown as one example of a tire component formed according to the present invention. Because of the position of the apex 60 in a tire sidewall region (not shown), longitudinal strength is required in areas A1 and A2, and lateral strength is required in area A3. It is generally understood that composite articles possess higher tensile strength in the fiber direction and lower tensile strength perpendicular to fiber orientation. Therefore, it is sometimes favorable to orient the fibers 64 in areas A1 and A2 in directions which differ considerably from the fiber orientation in area A3.

With reference to FIGS. 5 and 6, fiber direction is oriented perpendicular to the injection direction in region 59 and then changed to the direction parallel to the injection direction due to cavity gauge narrow down at the regions 57, 58.

With continuing reference to FIG. 6, the fibers 64 in areas A1 and A2 are generally aligned longitudinally, while the fibers 64 of area A3 are generally laterally aligned.

EXAMPLE 3

Figure 7:
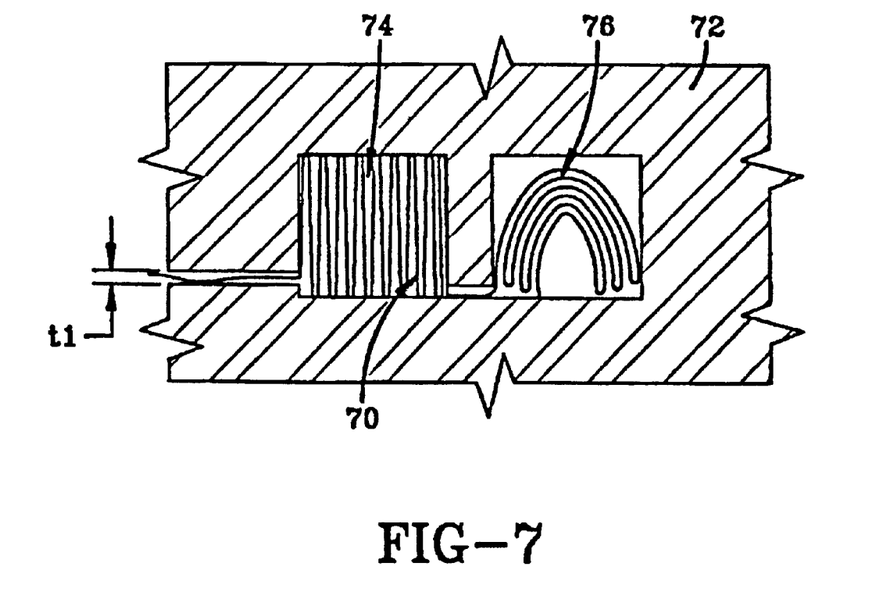
FIG. 7 is a front cross-sectional view of yet another embodiment mold and molding compound according to the invention, and, FIG. 8 is a front cross-sectional view of yet another mold and molding compound according to the invention.
Figure 8:
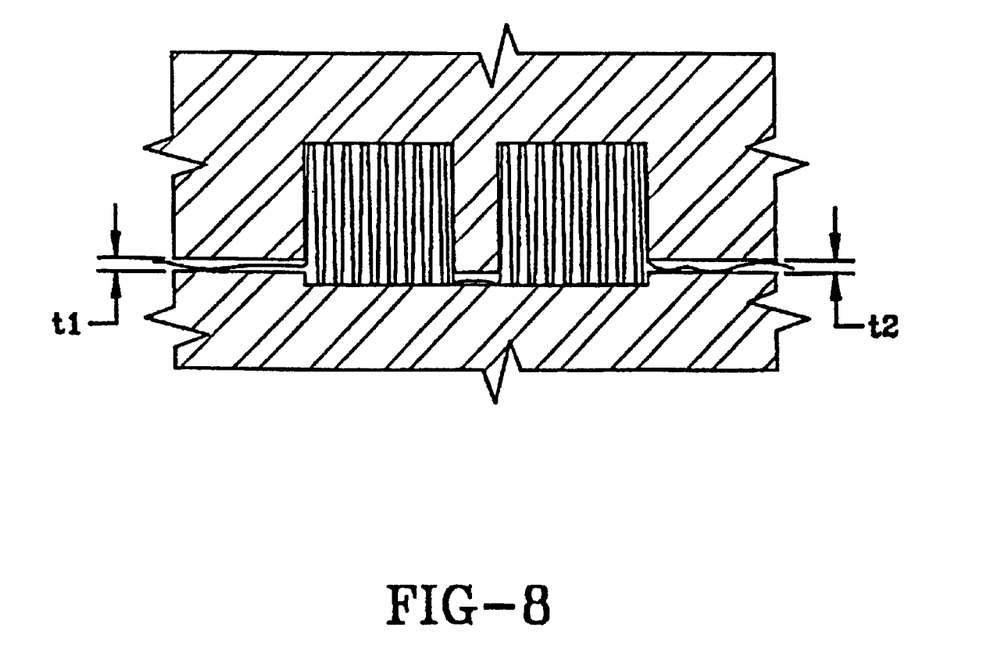

FIG. 7 shows a molded part 70, formed by an injection molding process in mold 72 according to the invention. The molded part includes two areas 74, 76. If only one inlet gate is used, FIG. 7, the side close to the gate, cavity 74, will have fiber oriented in the direction perpendicular to the injection direction, but the other side, cavity 76, will have fibers oriented in the direction parallel to the injection direction. This is because the groove will break up the folding phenomenon as shown in FIG. 7. FIG. 8 shows that two inlet gates are used. The short fibers are oriented in the direction perpendicular to the injection direction in both cavities.

The preferred elastomeric materials for use in the methods of the present invention include those commonly used in the production of tires, including passenger and radial medium truck tires, such as natural rubbers, synthetic rubbers, and their blends. The reinforcing fibers are generally known as "short fibers" and may be kevlar pulp, nylon, fiberglass, hyten, acrylic and the like having a length in the range of from 0.1 microns to $10^3$ microns. Generally, any fiber able to withstand the temperatures associated with injection molding and rubber curing can conceivably be used if they are chosen with sound engineering judgment for the particular application in mind. However, the invention has wider applicability and should not be restricted only to elastomeric materials used in the manufacture of tires. These compounds may have to be slightly modified for injection molding applications, such as through the use of accelerators, lubricants, and other additives within the skill of the art.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A method for producing a fiber reinforced composite article (40) by injecting a molding compound into a mold cavity (20) of a mold assembly (10), said molding compound (30) comprising elastomeric material and reinforcing fibers, said fibers having a length from 0.1 microns to $10^3$ microns, the method being characterized by the steps of:

directing a portion of said molding compound through an inlet gate (24), said inlet gate having an associated length $l_1$, width $w_1$, and thickness $t_1$, and such that a majority of said reinforcing fibers contained in said portion are oriented parallel to a direction of flow in said inlet gate; and directing said portion from said inlet gate into a region of said mold cavity, said region of said mold cavity having a thickness $T_1$ parallel to $t_1$, wherein $T_1$ is greater than or equal to $10t_1$, said portion of said molding compound forming a series of folding planes (35) perpendicular to the direction of flow in said region, and wherein said majority of said reinforcing fibers are oriented in a direction perpendicular to the direction of flow in said fiber reinforced composite article.

2. The method of claim 1 wherein said reinforcing fibers have a swell ratio equal to or smaller than 0.85 parallel to the direction of flow in said inlet gate.

3. The method of claim 1 wherein said the ratio of part thickness to gate thickness should be sufficiently large so that the reinforcing fibers have a swell ratio equal to or smaller than 0.85 and have orientation direction perpendicular to the direction of flow in said inlet gate.

4. The method of claim 1 further comprising the step of:

forming said molding compound by mixing said fiber to said elastomeric material in a weight ratio of from 1% to 20%.

5. The method of claim 1 wherein the ratio of $T_1/t_1$ is greater than 10.

6. The method or claim 1 further comprising the step of:

directing a second portion of said molding compound through a second inlet gate, said second inlet gate having an associated length $l_2$, width $w_2$, and thickness $t_2$, and wherein a majority of said reinforcing fibers contained in said second portion are oriented parallel to the direction of flow in said second inlet gate.

7. The method of claim 6 further comprising the step of:

directing said second portion from said second inlet gate into a second region of said mold cavity, said second region of said mold cavity having a thickness $T_2$, parallel to $t_2$, wherein $T_2$ is greater than or equal to $10t_2$, said second portion forming a series of folding planes, said planes being perpendicular to the direction of flow in said second region, and wherein said majority of said reinforcing fibers are oriented in a direction perpendicular to direction of flow.

8. The method of claim 1 wherein said elastomeric material is selected from the group consisting of: natural rubbers, synthetic rubbers, and their blends.

9. The method of claim 1 wherein said reinforcing fibers are selected from the group consisting of: kevlar pulp, nylon, hyten, and acrylic.

* * * * *